(12) United States Patent
Speer et al.

(10) Patent No.: US 8,733,703 B1
(45) Date of Patent: May 27, 2014

(54) DROGUE WITH POWER GENERATOR

(71) Applicant: The Boeing Company, Chicago, IL (US)

(72) Inventors: Thomas E. Speer, Des Moines, WA (US); Dan J Clingman, Milton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/725,455

(22) Filed: Dec. 21, 2012

Related U.S. Application Data

(62) Division of application No. 12/947,023, filed on Nov. 16, 2010, now Pat. No. 8,398,028.

(51) Int. Cl.
*B64D 39/00* (2006.01)

(52) U.S. Cl.
USPC .................................. 244/135 A; 244/135 R

(58) Field of Classification Search
USPC ........................................ 244/135 A, 135 R
See application file for complete search history.

(56) References Cited

U.S. PATENT DOCUMENTS

| | | | |
|---|---|---|---|
| 6,222,968 B1 | 4/2001 | Dotzer et al. | |
| 6,604,711 B1 * | 8/2003 | Stevens et al. | 244/135 A |
| 7,147,186 B2 | 12/2006 | Adelson | |
| 7,219,857 B2 | 5/2007 | Takacs et al. | |
| 7,377,468 B2 | 5/2008 | Saggio | |
| 7,404,530 B2 | 7/2008 | Saggio et al. | |
| 7,422,179 B2 * | 9/2008 | Mouskis | 244/135 A |
| 7,431,241 B2 * | 10/2008 | Adelson | 244/135 A |
| 7,681,839 B2 * | 3/2010 | Mickley et al. | 244/135 A |
| 7,793,887 B2 | 9/2010 | Adelson | |
| 8,152,104 B2 * | 4/2012 | Mouskis | 244/135 R |
| 2005/0230555 A1 * | 10/2005 | Strong | 244/152 |
| 2006/0060709 A1 * | 3/2006 | Thal | 244/135 A |
| 2006/0060710 A1 * | 3/2006 | Takacs et al. | 244/135 A |
| 2006/0102791 A1 * | 5/2006 | Adelson | 244/135 A |
| 2006/0108475 A1 * | 5/2006 | Bartov | 244/135 A |
| 2006/0226293 A1 * | 10/2006 | Mickley et al. | 244/135 A |
| 2006/0284019 A1 * | 12/2006 | Takacs et al. | 244/135 A |
| 2007/0102583 A1 * | 5/2007 | Cutler et al. | 244/135 A |
| 2007/0181748 A1 * | 8/2007 | Mouskis | 244/135 A |
| 2008/0054124 A1 * | 3/2008 | Takacs et al. | 244/135 A |
| 2008/0210808 A1 * | 9/2008 | Adelson | 244/10 |
| 2008/0315722 A1 | 12/2008 | Clingman et al. | |
| 2009/0039201 A1 * | 2/2009 | Adelson | 244/135 A |
| 2009/0224633 A1 | 9/2009 | Clingman et al. | |
| 2010/0001124 A1 * | 1/2010 | Feldmann | 244/58 |
| 2010/0072320 A1 * | 3/2010 | Bartov | 244/135 A |
| 2010/0108815 A1 * | 5/2010 | Stecko et al. | 244/135 A |
| 2010/0270431 A1 * | 10/2010 | Mouskis | 244/135 A |
| 2011/0001011 A1 * | 1/2011 | Degiorgis et al. | 244/135 A |
| 2011/0226905 A1 * | 9/2011 | Kirkland et al. | 244/135 A |

* cited by examiner

*Primary Examiner* — Christopher P Ellis
*Assistant Examiner* — Medhat Badawi
(74) *Attorney, Agent, or Firm* — Toler Law Group, PC

(57) ABSTRACT

In one embodiment a method to provide electrical power to an aerial refueling drogue, wherein the aerial refueling drogue comprises a plurality of piezoelectric patches disposed on flexible members, comprises deploying the aerial refueling drogue into an airstream and harvesting energy produced by the piezoelectric patches. Other embodiments may be described.

5 Claims, 4 Drawing Sheets

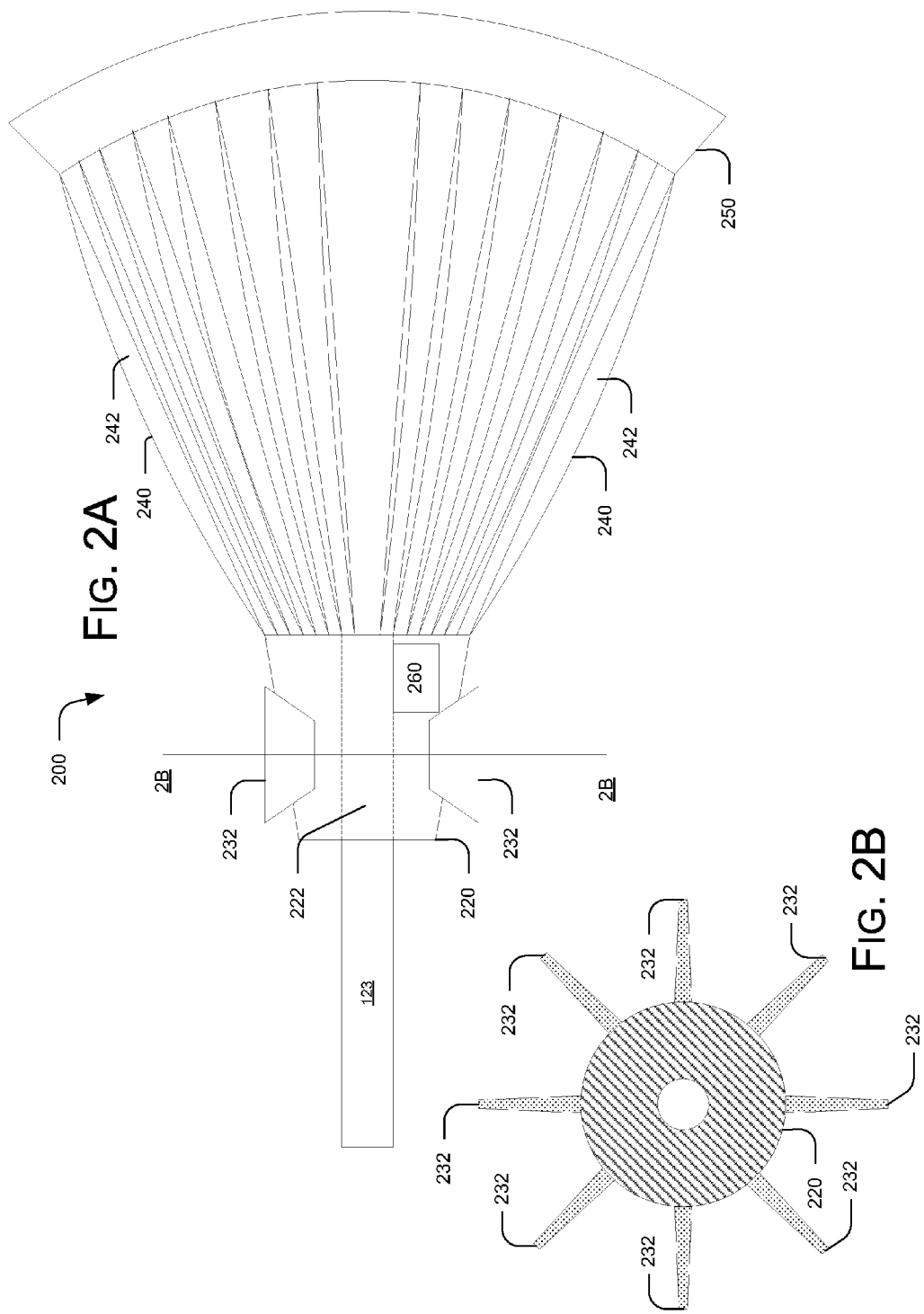

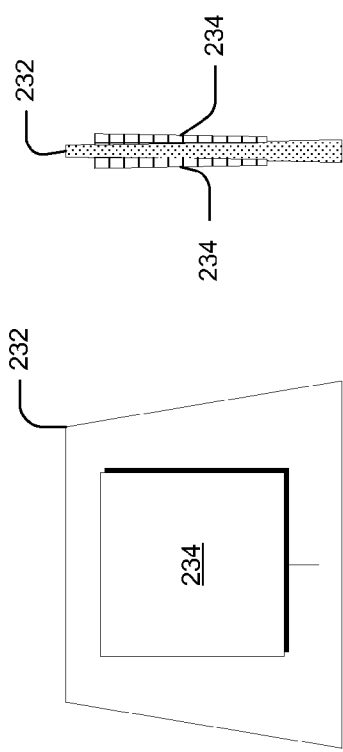
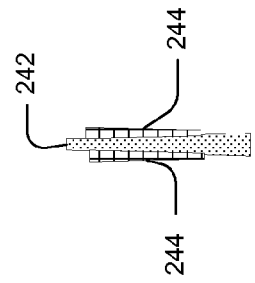
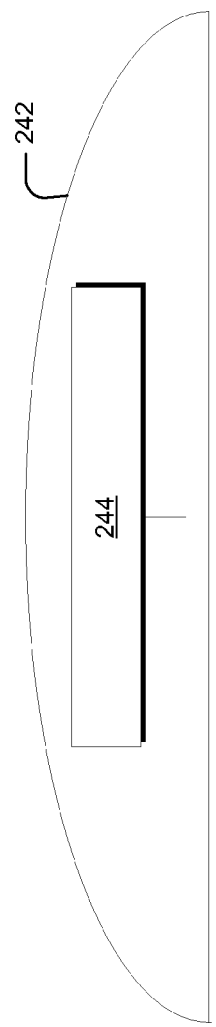

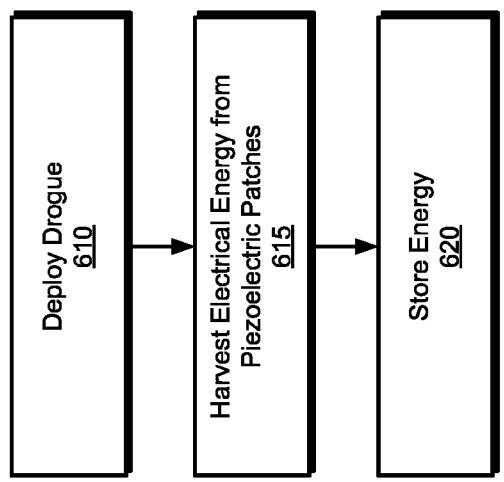
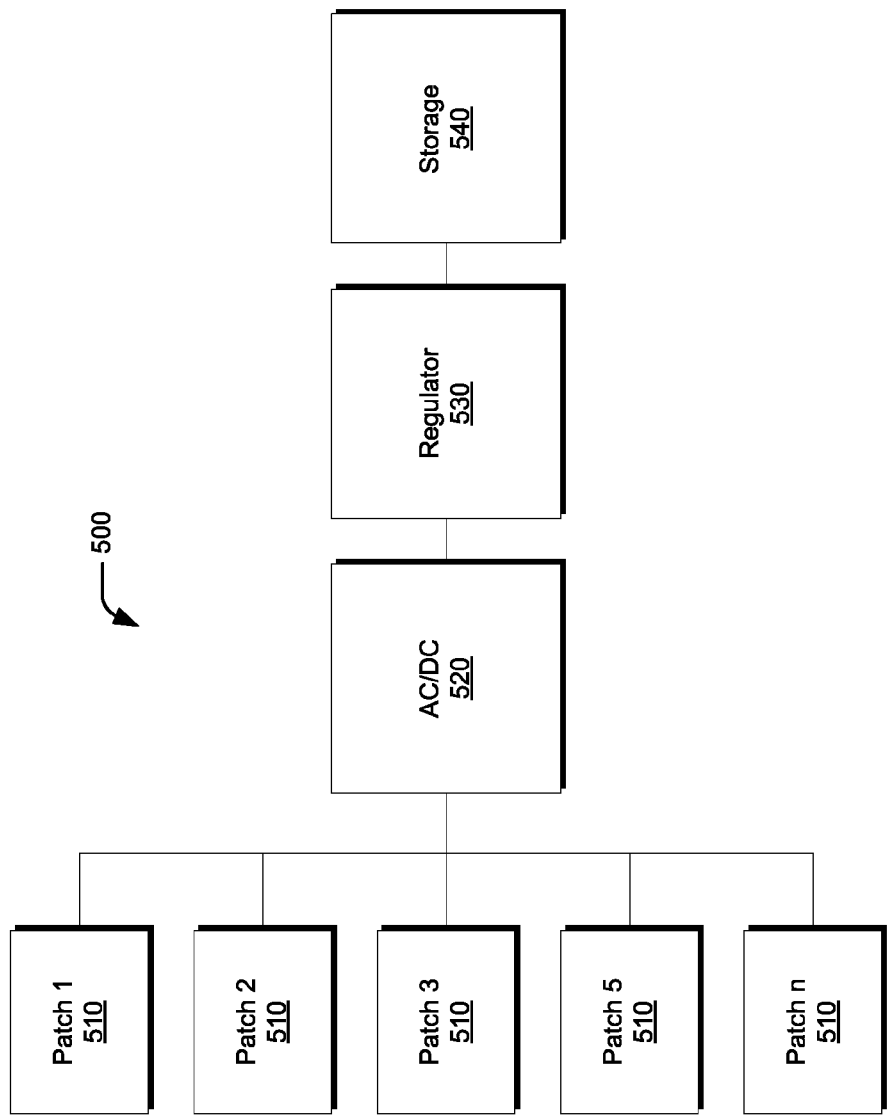

DROGUE WITH POWER GENERATOR

RELATED APPLICATIONS

This application is a divisional of U.S. patent application Ser. No. 12/947,023, to Speer, et al., entitled DROGUE WITH POWER GENERATOR, filed Nov. 16, 2010, the disclosure of which is incorporated herein by reference in its entirety.

BACKGROUND

The subject matter described herein relates to refueling drogues. More particularly, the disclosure relates to refueling drogues which include power generation capabilities which may be used to power a control system for the drogue.

In order to extend the flight range of certain aircraft, some aircraft have been designed with in-flight refueling or air-to-air refueling capabilities. One type of refueling system is a hose and drogue system. The hose and drogue system includes a refueling hose having a drogue disposed at one end. A drogue is a funnel shaped device attached to the end of a refueling hose for connecting with the probe of another aircraft to be refueled in flight. The refueling hose connects to a Hose Drum Unit (HDU). When not in use, the refueling hose and drogue is reeled completely into the HDU. During operation, the refueling tanker flies straight and level and extends the refueling hose and drogue which trails behind and below the refueling tanker under normal aerodynamic forces. Tension on the refueling hose is aerodynamically balanced by a motor in the HDU so that as the receiver aircraft moves, the refueling hose retracts and extends in order to prevent bends in the refueling hose that may cause undue side loads on the refueling probe.

The second type of refueling system is a boom refueling system. The boom refueling system typically includes a rigid boom extending from the refueling tanker, with a probe and nozzle at its distal end. The boom also includes airfoils controlled by a boom operator stationed on the refueling aircraft. The airfoils allow the boom operator to actively maneuver the boom with respect to the receiver aircraft, which flies in a fixed refueling position below and aft of the tanker aircraft.

Although in-flight refueling is a relatively common operation, the aircraft to be refueled must be precisely positioned relative to the refueling tanker in order to provide safe engagement while the fuel is dispensed to the receiver aircraft. Different systems have been designed to automate the positioning process. For example, some boom refueling systems use cameras housed in the tanker aircraft to determine the distance between the receiver aircraft and the tip of a refueling boom carried by the tanker aircraft. The camera system can then be used to automatically control the position of the boom to mate with a corresponding refueling receptacle of the receiver aircraft.

In another system, a drogue can include movable, overlapping vanes and a canopy. The vanes may be moved to increase or decrease the size of the diameter of the drogue for high speed flight or for lower flight speeds. The drogue may include actuators to control the motion of the vanes and or the canopy. The motion of the actuators may be controlled by a guidance and control system. The guidance system can receive information corresponding to the current state of the drogue and a target state of the drogue. The guidance system can provide instructions to the control system that in turn directs the actuators to drive the configuration of the drogue from the current state to the target state.

The use of aerial refueling systems may be expanded if the refueling drogue had the ability to generate and store electrical power that could be used to run guidance and control systems of the refueling system. This would allow aerial refueling drogues to be retrofitable by bolting on to the end of the refueling hose of existing aerial refueling systems such as Wing Aerial Refueling Pods (WARPs) or Fuselage Hose Drum Units (HDUs). However, present refueling drogues do not have the ability to generate and store its own electrical power which to run the guidance and control systems.

Onboard wind mill generators located on the external surface of a drogue have been proposed to generate a small amount of power to help illuminate the drogue so the receiver aircraft pilot can see it during night refueling. However, wind mill generators are inefficient and may not be able to generate sufficient amounts of power to run guidance and control systems of the refueling system. These types of generators also take up valuable space under the drogue cowling, space that is needed for the guidance and control system.

Onboard battery packs have also been proposed to provide for a controllable drogue power system. However, battery packs only have a limited supply of power before needing to be recharged. In these systems, when the battery packs needed to be recharged, the drogue would have to be retracted back into the aerial refueling pods or HDU of the host aircraft. Once the batteries were recharged, the drogue could be re-extended to refuel again. This is a time consuming process. Furthermore, if the battery packs were to be depleted of power sometime during the refueling process, this could be problematic for the refueling tanker and the aircraft to be refueled.

SUMMARY

In various aspects, aerial refueling drogues which include piezoelectric power systems are described. In one embodiment an aerial refueling drogue comprises a coupling having a channel formed therethrough, at least one flexible fin disposed on a surface of the coupling, and at least one piezoelectric patch disposed on the flexible fin.

In another embodiment a method to provide electrical power to an aerial refueling drogue is provided. The aerial refueling drogue comprises a plurality of piezoelectric patches disposed on flexible member. The method comprises deploying the aerial refueling drogue into an airstream and harvesting energy produced by the piezoelectric patches.

In another embodiment an aerial refueling drogue comprises a coupling having a channel formed therethrough, a shroud, and a piezoelectric energy collection system.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

FIG. 2A is a schematic, side-view illustration of a refueling drogue, according to embodiments.

FIG. 2B is a cross-sectional view illustration of a coupling for a refueling drogue, according to embodiments.

FIG. 3A is a schematic, side-view illustration of a fin for a refueling drogue, according to embodiments.

FIG. 3B is a cross-sectional view illustration of a fin for a refueling drogue, according to embodiments.

FIG. 4A is a schematic, side-view illustration of a strut for a refueling drogue, according to embodiments.

FIG. 4B is a cross-sectional view illustration of a strut for a refueling drogue, according to embodiments.

FIG. 5 is simplified block diagram illustrating components of a power system for a refueling drogue, according to embodiments.

FIG. 6 is a flowchart illustrating operations in a method to provide electrical power to an aerial refueling drogue

DETAILED DESCRIPTION

Figure 1:
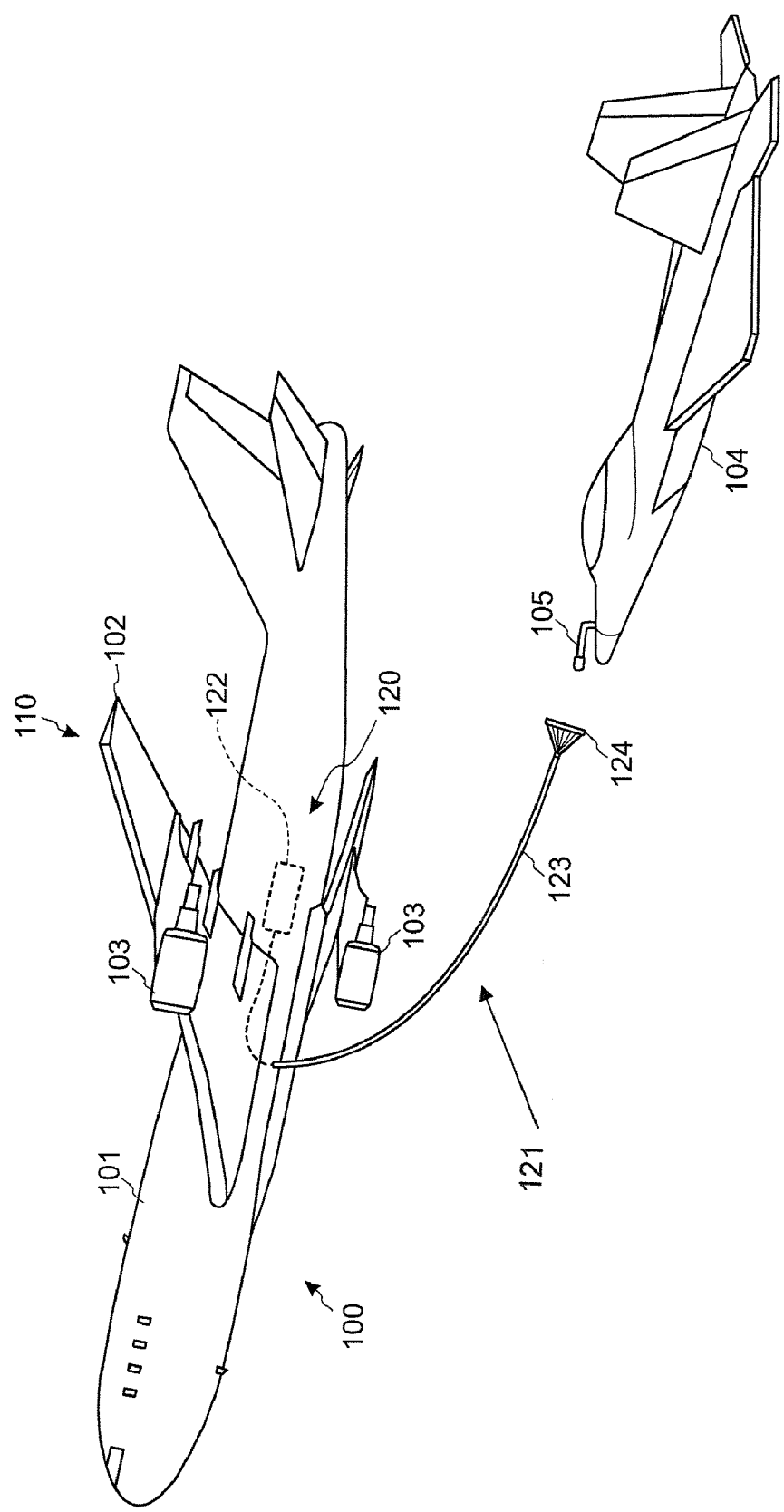
FIG. 1 is schematic illustration a of a tanker aircraft using a controllable aerial refueling drogue having a self-contained electrical generator for refueling a receiver aircraft, according to embodiments.

In the following description, numerous specific details are set forth to provide a thorough understanding of various embodiments. However, it will be understood by those skilled in the art that the various embodiments may be practiced without the specific details. In other instances, well-known methods, procedures, and components have not been illustrated or described in detail so as not to obscure the particular embodiments.

FIG. 1 is schematic illustration a of a tanker aircraft using a controllable aerial refueling drogue having a self-contained electrical generator for refueling a receiver aircraft, according to embodiments. Referring to FIG. 1, a refueling system 110 is shown. The refueling system 110 may include a tanker aircraft 100 which is positioned to be coupled to a receiver aircraft 104 which needs to be refueled using an aerial refueling device 120.

In the embodiment shown in FIG. 1, the tanker aircraft 100 may have a fuselage 101, wings 102, and one or more engines 103. The tanker aircraft 100 shown in FIG. 1 is shown as an example and the tanker aircraft 100 may take on other forms. The tanker aircraft 100 may have an aerial refueling device 120 attached thereto. The aerial refueling device 120 may include an on-board portion 122 and a deployable portion 121. In accordance with one embodiment, the on-board portion may have a hose reel actuator and associated valves. The deployable portion 121 may include a hose 123 and a drogue 124.

The position of the drogue 124 may be controlled in an automatic fashion to align and couple with a probe 105 of a receiver aircraft 104. In at least some embodiments, the guidance and control system for effectuating the alignment and control may be carried entirely by the deployable portion 121 of the refueling device 120. Accordingly, not only can the process for coupling the drogue 124 to the receiver aircraft 104 be automated or at least partially automated, but the components that execute the automated process need not be carried on-board the tanker aircraft 100. This arrangement can simplify the tanker aircraft 100 and can significantly reduce the effort and expense required to retrofit the guidance system on an existing drogue-carrying tanker aircraft 100.

As stated above, the use of refueling systems 110 may be expanded if the drogue 124 had the ability to generate and store electrical power that could be used to run the guidance and control systems. This would allow aerial refueling drogues to be retrofitable by bolting on to the end of the refueling hose of existing aerial refueling systems.

In some embodiments the drogue 124 may be implemented as a controllable drogue as described in commonly assigned U.S. Pat. No. 7,219,857 to Takacs, et al., or as in commonly assigned U.S. patent application Ser. No. 12/265,449 to Steko, et al., (U.S. Patent Publication No: 20100108815 A1) the disclosures of which are incorporated herein by reference in their respective entirety. In other embodiments the drogue 124 may be a passive drogue. A controllable drogue 124 may utilize a power source to provide electrical power for the control system for the drogue 124. A passive drogue 124 may utilize a power source to provide power for an illumination system or a beacon system. Thus, power supplies for drogues find utility in both controllable drogues and passive drogues.

Described herein are aerial refueling drogues which are adapted to include a piezoelectric power supply system, and methods of using such drogues. In the interest of brevity, passive aerial refueling drogues are described herein. However, one skilled in the art will recognize that piezoelectric power supply systems may be implemented in controllable drogues such as those described in U.S. Pat. No. 7,219,857 to Takacs, et al and U.S. Patent Publication No: 20100108815 A1 to Steko, et al.

One embodiment of a drogue assembly is presented in FIGS. 2A-2B. FIG. 2A is a schematic, side-view illustration of a refueling drogue, according to embodiments. FIG. 2B is a cross-sectional view illustration of a coupling for a refueling drogue, according to embodiments. Referring FIGS. 2A and 2B, in some embodiments an aerial refueling drogue assembly 200 comprises a coupling 220 adapted to mate with a hose 123, as described above. The coupling 220 comprises a channel 222 through which fluids (e.g., fuel) may pass. The channel 222 may of approximately the same diameter as the hose 123 to which the coupling is connected. Drogue assembly 200 further comprises a shroud 250 which is supported by a plurality of struts 240, which forms what is sometimes referred to in the art as the drogue basket.

The coupling 220 comprises a plurality of fins 230 which extend radially from the exterior surface of the coupling 220. In the embodiment depicted in FIGS. 2A and 2B the coupling 220 comprises a total of eight (8) fins which extend longitudinally along the surface of the coupling 220. One skilled in the art will recognize that more or fewer fins 230 may be used. In the embodiment depicted in FIG. 2B the respective fins 230 have a cross-sectional thickness that is tapered, i.e., the cross-sectional thickness is wider at the bottom than the top. The specific size of the fins 230 is not critical. In some embodiments the fins 230 may measure between approximately 1 inches and 4 inches (i.e., 2.5 to 10 centimeters) in height and 1 inches and 6 inches (i.e., 2.5 to 15 centimeters) in width. The thickness of the fins 230 may vary between 0.02 inches and 0.10 inches (i.e., 0.05 to 0.25 centimeters).

Further one or more of the struts 240 may comprise a fin 242 extending along the longitudinal extent of the strut 240. The fins 242 may have a cross-sectional thickness that is tapered, i.e., the cross-sectional thickness is wider at the bottom than the top. The specific size of the fins 242 is not critical. In some embodiments the fins 242 may measure between 16 inches and 24 inches (i.e., 32 to 60 centimeters) in length and 1 inches and 5 inches (2.5 to 12.5 centimeters) in width. The thickness of the fins 230 may vary between 0.02 inches and 0.3 inches (0.05 to 0.75 centimeters).

The fins 232, 242 may be formed from a flexible material, e.g., a polymer, rubber, or the like, which enables the fins to deform, or flutter, when the drogue is placed into an airstream. Optionally, a shroud (not shown) may be positioned around the fins 232 in a manner similar to the shroud 250.

In some embodiments one or more of the fins 232 may comprise a piezoelectric patch disposed on a surface thereof to generate electrical current in response to the motion of the fins 232. FIG. 3A is a schematic, side-view illustration of a fin for a refueling drogue, according to embodiments, and FIG. 3B is a cross-sectional view illustration of a fin for a refueling drogue, according to embodiments. Referring to FIGS. 3A and 3B, in one embodiment a piezoelectric patch 234 is secured to each opposing side of the fin 232, such that deformation of the piezoelectric patches 234 created by the motion of the fin 232 generates an electrical current in each of the piezoelectric patches 234.

Similarly, one or more of the fins 242 may comprise one or more piezoelectric patches 244 on a surface thereof to generate electrical current in response to the motion of the fins 242. FIG. 4A is a schematic, side-view illustration of a strut for a refueling drogue, according to embodiments. FIG. 4B is a cross-sectional view illustration of a strut for a refueling drogue, according to embodiments. Referring to FIGS. 4A and 4B, in one embodiment a piezoelectric patch 244 is secured to each opposing side of the fin 242, such that deformation of the piezoelectric patches 244 created by the motion of the fin 242 generates an electrical current in each of the piezoelectric patches 244.

Electricity generated by the respective piezoelectric patches 234, 244 may be directed into an energy collection system. FIG. 5 is simplified block diagram illustrating components of an energy collection system 500 for a refueling drogue, according to embodiments. Referring to FIG. 5, in some embodiments the energy collection system 500 comprises a plurality of piezoelectric patches 500, which may correspond to the patches 234, 244. The patches 510 generate alternating current (AC) electricity, which is input into an AC/DC converter 510 to convert the AC electricity to a direct current (DC) electricity. The DC electricity may be input into a voltage regulator 530 to produce electricity of a desired voltage, which is stored in an energy storage medium 540, e.g., a battery pack.

FIG. 6 is a flowchart illustrating operations in a method to provide electrical power to an aerial refueling drogue 200. Referring to FIG. 6, at operation 610 a drogue 200 is deployed. In some embodiments the drogue assembly 200 may be deployed by releasing the drogue 200 from a tanker aircraft such that the drogue 200 is places into the airstream. When the drogue is deployed into the airstream the fins 232, 242 flutter in the airstream, which causes the respective piezoelectric patches 234, 244 to generate electricity.

At operation 615 the electrical from the piezoelectric patches 234, 244 is harvested, e.g. by directing the electrical energy into the AC/DC converter 520 and the voltage regulator 530. At operation 620 the electrical energy generated by the piezoelectric patches is stored in the energy storage medium 540.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to provide electrical power to an aerial refueling drogue, wherein the aerial refueling drogue comprises a plurality of piezoelectric patches disposed on flexible members, the method comprising:
   deploying the aerial refueling drogue into an airstream; and
   harvesting energy produced by the piezoelectric patches, wherein the drogue comprises:
   a shroud; and
   a plurality of struts coupled to the shroud, wherein at least one strut comprises a flexible fin.

2. The method of claim 1, wherein deploying the aerial refueling drogue into an airstream comprises releasing the aerial drogue from an aircraft.

3. The method of claim 1, further comprising storing at least a portion of the energy harvested from the piezoelectric patches in an energy storage device.

4. The method of claim 1, further comprising using at least a portion of the energy harvested from the piezoelectric patches to power a guidance system for the aerial refueling drogue.

5. The method of claim 1, further comprising using at least a portion of the energy harvested from the piezoelectric patches to power at least one of a camera or an illumination source coupled to the drogue.

* * * * *